Aug. 11, 1936.  E. R. MORTON  2,050,624
MOTOR CONTROL CIRCUIT
Filed May 10, 1933
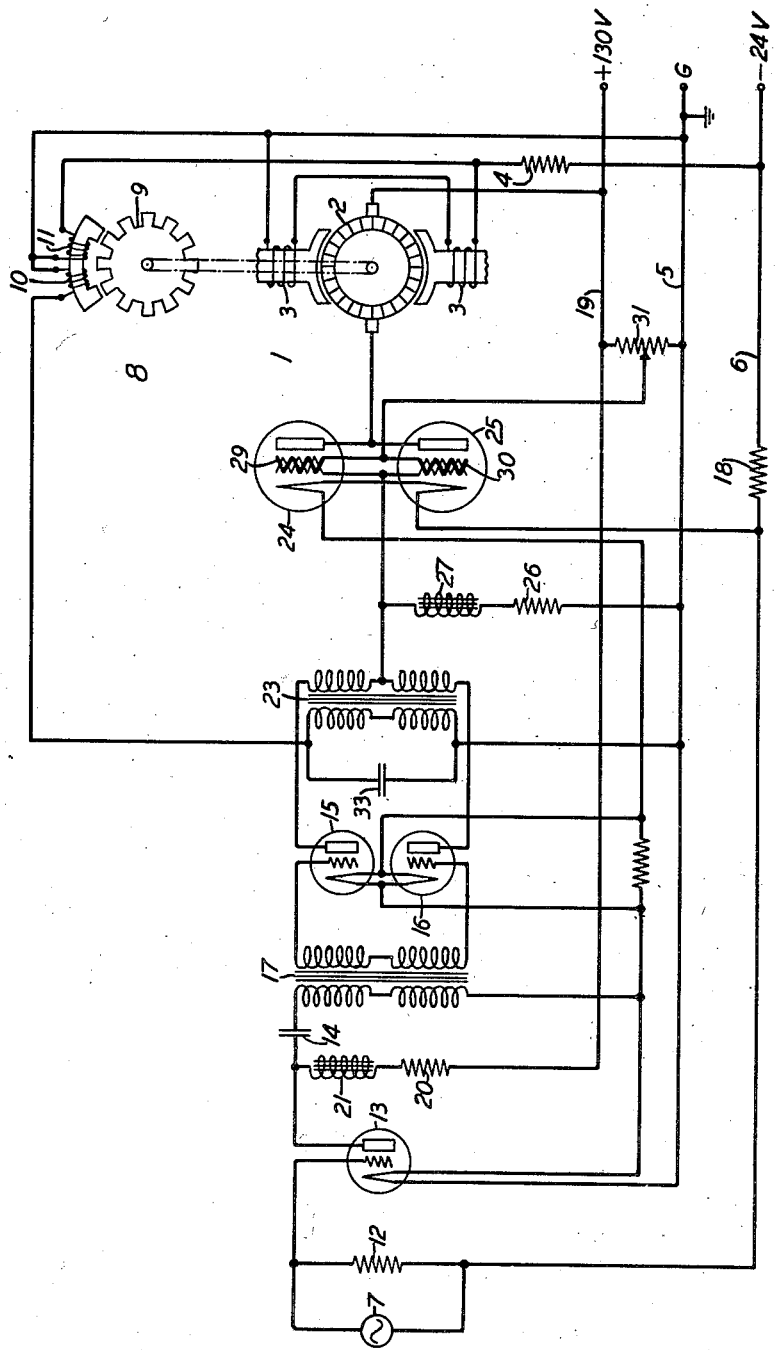
INVENTOR
E. R. MORTON
BY
Wayne B Wells
ATTORNEY Patented Aug. 11, 1936

2,050,624

UNITED STATES PATENT OFFICE 2,050,624

MOTOR CONTROL CIRCUIT

Edmund R. Morton, New York, N. Y., assignor, by mesne assignments, to Western Electric Company, Incorporated, New York, N. Y., a corporation of New York Application May 10, 1933, Serial No. 670,261

15 Claims. (Cl. 172—293)

This invention relates to motor control circuits and particularly to circuits for operating a motor synchronously with a source of standard frequency alternating circuit.

One object of the invention is to provide a control circuit that shall hold a motor in synchronism with a source of standard frequency alternating current in an improved manner and that shall insure against hunting action by the motor.

Another object of the invention is to provide a motor control circuit that shall hold a motor in synchronism with a source of standard frequency alternating current by supplying the motor armature with current varying according to the phase relation between the standard frequency source of current and a source of alternating current having a frequency varying according to the motor speed.

A further object of the invention is to provide a motor control circuit for a motor having a pilot generator connected thereto that shall control the motor armature current according to the phase relation between a source of standard frequency current and the generator current for holding the motor in synchronism with the standard frequency source and that shall tune the generator circuit to prevent hunting action.

In many arts it is essential to operate two or a number of members in synchronism with very close precision. In the transmission of pictures from one point to a distant point by electric currents, it is essential to operate the motors at the transmitting and receiving stations in synchronism with very close precision. In a picture transmission system, it is not only desirable to hold the motors at the transmitting and receiving stations in synchronism with precision but it is also desirable to prevent hunting action by the motors.

In a circuit constructed in accordance with the present invention which is employed in a picture transmission system a source of standard frequency alternating current is provided at each station and the motors at the stations are held in synchronism with the standard frequency sources. The standard frequency sources at the different stations develop currents of the same frequency so that the motors at the different stations are held in synchronism with each other. Means is also provided at each station for insuring against hunting action by the motor.

In accordance with the present invention a direct current motor is provided at each station for operating the picture apparatus. Each motor comprises an armature winding which is controlled to hold the motor in synchronism with the source of standard frequency current and a field winding. The field structure of the motor is maintained substantially saturated in order to minimize any changes of field strength due to changes in the field current. The motor is operated at relatively slow speed at about 100 revolutions per minute. On account of the very low speed of the motor it is possible to secure faster and more complete regulation by controlling the armature current in place of the field current.

The current supplied to the motor armature is controlled in accordance with the phase relation between a source of alternating current having a frequency varying according to the motor speed and a source of standard or constant frequency alternating current. The source of standard frequency current preferably develops a current having a frequency of the order of 300 cycles per second.

The source of alternating current which has a frequency varying according to the speed of the motor preferably comprises an inductor generator directly connected to the motor. If so desired the generator may be built in the frame of the motor. The armature winding of the generator supplies alternating plate potential to two phase-detector tubes which are connected in push-pull relationship. A source of constant frequency current is amplified and then connected to the grids of the phase-detector tubes. The output from the phase-detector tubes varies in accordance with the phase relation between the potentials impressed on the grids and plates. The source of standard frequency alternating current is held constant, whereas the frequency of the generator varies according to the speed of the motor. Accordingly, it is seen a corrective current is obtained in the output of the phase-detector tubes which may be used for holding the motor in synchronism with the source of standard frequency alternating current.

The output circuit of the phase-detector tubes is coupled to two amplifier space discharge devices by means of a resistance element and an inductive element. The inductive element in the coupling between the phase-detector tubes and the amplifier space discharge devices operates in the manner of tangential inertia in a mechanical governor to prevent hunting action. The armature winding of the motor is connected in the output circuit of the amplifier devices and the motor is thus controlled in accordance with the phase relation between the source of standard frequency alternating current and the variable frequency current from the generator operated by the motor. The output current from the phase-detector tubes is so varied according to the phase relation between the two sources of alternating current as to accelerate or decelerate the motor and hold it in exact synchronism with the source of standard frequency alternating current.

A condenser is connected across the armature winding of the pilot generator to tune the circuit of said generator to a frequency slightly above the frequency normally produced by the generator when the motor is in exact synchronism with the source of standard frequency alternating current. The condenser connected across the armature winding of the generator produces an anti-hunting means of the damping type. In general there are three methods of preventing hunting action by a regulated machine. These methods are known generally as tangential inertia, delayed compensation and damping. In the tangential inertia method of preventing hunting a force is applied to the machine to be regulated by a property of the regulator which is sensitive to acceleration of the machine. This force applied to the machine anticipates the normal action of the regulator during periods of acceleration. In the damping method of preventing hunting action a force is applied to the machine by means of the regulator which tends to partially neutralize the effect of the regulator during acceleration. In the delayed compensation method of preventing hunting action which is a variation of the damping method, the normal regulation is accomplished at reduced precision, but gradually the regulator is compensated to correct the machine as completely as the particular regulator is capable of operating. In the present regulator circuit, which is of the chronometric type, the condenser connected across the generator provides anti-hunting means of the damping type and the inductance inserted in the coupling means between the phase detector tubes and the amplifier devices provides anti-hunting means of the tangential inertia type. Anti-hunting means of the delayed compensation type is generally not suitable for use in a regulator of the chronometric type.

In considering the operation of the condenser connected across the generator armature, it must be remembered that very minute effects as compared with the magnitude of maximum regulating effects may cause or prevent hunting action in a regulator.

The generator circuit has high internal or leakage reactance and the condenser is adjusted to tune this reactance to a frequency slightly higher than the normal operating frequency of the machine so that the generator is operating at a frequency on the steep portion of the tuning curve. Thus a slight increase of the speed of the motor and the generator above normal would produce a substantial increase in the output voltage of the generator. Under the conditions for which this regulator was designed a pilot generator delivering 300 cycles per second is employed and as is common with synchronous machines, a maximum phase displacement of 180° is theoretically possible before synchronism is lost. For the purpose of this discussion it may be assumed that due to some circuit condition the motor is lagging 90 electrical degrees from its control frequency and then is permitted to accelerate. The natural period of oscillation of the machine may be considered to be about 6 cycles per second. Under this condition the machine can run delivering an output frequency one per cent higher than normal or 303 cycles for approximately ⅙ of a second before advancing to the 90° lead phase portion. This increase in frequency will produce an increase in the terminal voltage of somewhat more than one per cent depending on the time constant of the generator condenser combination and this increase of voltage applied to the plate of the phase-detector tube may produce an effect of several times the percentage effect in the motor control due to the amplification in the power amplifier control tubes. The tuned generator circuit produces an effect in the control circuit of possibly 10% and would tend to prevent the acceleration or deceleration of the motor due to hunting or any other cause and actually is feeble enough not to affect the regulation of the motor under normal conditions. The action of the tuned circuit in preventing hunting is substantially the same as the action of a hydraulically damped loose flywheel on the armature shaft of the motor.

Preferably, the motor field structure is provided with damping windings or copper bars of the type disclosed in the application of H. M. Stoller, Serial No. 537,309, filed May 14, 1931.

The single figure in the accompanying drawing is a diagrammatic view of a control circuit constructed in accordance with the invention.

Referring to the drawing a motor 1 is provided with an armature winding 2 and field winding 3. The field winding 3 is connected in series with a regulating resistance 4 across a ground conductor 5 and a supply conductor 6. The field structure of the motor is substantially saturated in order to prevent any variation in the speed of the motor by variations in voltage of the field current. The current supplied to the armature of the motor is controlled in a manner to be hereinafter set forth to hold the motor in synchronism with a source of standard frequency current 7.

The motor 1 operates a pilot generator 8 to develop an alternating current having a frequency varying according to the motor speed. The pilot generator 8 comprises a toothed rotor 9, an armature winding 10 and a field winding 11. The field winding 11 for the generator is connected in circuit with the control resistance 4 across the ground conductor 5 and the supply conductor 6. The potential across the conductors 5 and 6 is preferably of the order of about 24 volts.

A resistance element 12 which is connected across the source of standard frequency source 7 supplies grid potential to a three-element amplifier tube 13. The amplifier tube 13 is coupled by a condenser 14 to a transformer 17. The transformer 17 is connected to the input circuit of two phase-detector tubes 15 and 16 which are connected in push-pull relationship. Although only one amplifier tube is shown between the source of standard frequency current and the phase-detector tubes, it is to be understood that any desired number of amplifier tubes may be employed. Grid biasing potential for the amplifier tube 13 is obtained from the supply conductor 6 in circuit with the resistance 18. Plate potential for the amplifier tube is obtained from a supply conductor 19 in circuit with an adjusting resistance 20 and a choke coil 21. The potential across the supply conductor 19 and the ground conductor 5 is preferably of the order of about 130 volts.

Plate potential for the phase-detector tubes 15 and 16 is obtained from the armature winding 10 of the pilot generator. The generator winding is connected to the plates of the phase-detector tubes by means of a transformer 23. In the circuit thus far described, the grids of the phase-detector tubes have potential impressed on them from the source of standard frequency current and the plates of the phase-detector tubes have potential impressed on them from the pilot generator which produces a frequency varying according to the speed of the motor 1. Accordingly, the output current from the phase-detector tubes 15 and 16 will vary according to the phase relation between the standard frequency current and the generator current. This output current from the phase-detector tubes is employed to control the motor armature current to hold the motor in synchronism with the source of standard frequency current.

The output circuit of the two phase-detector tubes 15 and 16 is coupled to two amplifier tubes 24 and 25 by means of a resistance element 26 and an inductance element 27. The inductance element 27 is used to increase the control force applied to the amplifier tubes 24 and 25 during transients and serves to provide a tangential inertia method of preventing hunting action. The two amplifier tubes 24 and 25 which are connected in parallel circuit relation are provided with two additional grids 29 and 30 having positive potential impressed on them from a potentiometer 31 connected across the supply conductor 19 and ground conductor 5. Amplifier tubes of this type are provided in order to permit the control of the motor armature at relatively low voltages. The output circuit of the amplifier tubes 24 and 25 is connected to the armature 2 of the motor in circuit with the supply conductors 19 and 6. The potential across the supply conductors 19 and 6 is of the order of about 154 volts. The current flowing through the armature winding 2 of the motor 1 is so regulated by the phase-detector tubes as to hold the motor in synchronism with the source of standard frequency alternating current. If the motor tends to accelerate, the supply of current for the armature is reduced and if the motor tends to decelerate the supply of current for the armature is increased.

A condenser 33 is connected across the armature winding 10 of the pilot generator to tune the generator circuit to a frequency slightly above the frequency of the generator when the motor is operating at normal speed and in synchronism with the source of standard frequency alternating current. The output from the pilot generator is operating on a steep portion of the tuning curve so that a change in the speed of the motor and generator will produce a very substantial change in the voltage output from the generator. The action of the condenser in preventing hunting action is the same in principle as a hydraulically damped flywheel which is loosely mounted on the shaft of a motor.

Modifications in the circuit and in the arrangement and location of parts may be made within the spirit and scope of the invention, and such modifications are intended to be covered by the appended claims.

What is claimed is:
1. In a control circuit, a low speed motor having a substantially saturated field and an armature winding, a source of constant frequency current, a source of alternating current having a frequency varying according to the motor speed, and means for supplying the armature of said motor with current according to the phase relation between said sources of current.

2. In a control circuit, a motor having a field winding and an armature winding, a source of constant frequency current, a source of alternating current having a frequency varying according to the motor speed, means for supplying the armature of said motor with current according to the phase relation between said sources of current, and means for tuning the circuit of the variable source to a frequency above the normal frequency of said variable source to prevent hunting action.

3. In a control circuit, a motor having a field winding and an armature winding, a source of constant frequency current, a source of alternating current having a frequency varying according to the motor speed, means comprising a phase-detector tube connected to said sources for supplying the armature of said motor with current according to the phase relation between said sources of current, and means comprising a condenser connected across the variable source for tuning the circuit of the variable source to a frequency above the normal frequency of the variable source to prevent hunting action.

4. In a control circuit, a motor having an armature winding and a field winding, a source of constant frequency current, an alternating current pilot generator connected to said motor for developing a current having a frequency varying according to the motor speed, means comprising a phase-detector tube connected to said source and to the generator for supplying the motor armature with current varying according to the phase relation of the current from said source and the current from said generator, and means for tuning the circuit of said generator to prevent hunting action.

5. In a control circuit, a relatively low speed motor having an armature winding and a field winding, a source of constant frequency alternating current, and control means for governing the motor to maintain the speed thereof synchronous with the frequency of said source, said control means comprising a source of alternating current having a frequency varying according to the motor speed and means for supplying the armature of said motor independently of the field winding with current varying according to the phase relation between the currents from said sources.

6. In a control circuit, a relatively low speed motor having an armature winding and a field winding, a source of constant frequency alternating current, control means for governing the motor to maintain the speed thereof synchronous with the frequency of said source, said control means comprising a source of alternating current having a frequency varying according to the motor speed and means for supplying the armature of said motor with current varying according to the phase relation between the currents from said sources, and means for tuning said variable source of alternating current to prevent hunting action.

7. In a motor control circuit, a motor having an armature and a field winding, a pilot generator operated by said motor to develop a current having a frequency varying according to the motor speed, a three-element phase-detector tube having potential impressed on the plate thereof by said generator, a source of standard frequency current impressing potential on the grid of said detector tube, the armature of said motor being connected to the output circuit of said detector tube to be operated according to the phase relation of the potentials impressed on the grid and plate of said tube, and means for tuning the circuit of said pilot generator to a frequency above the normal frequency of the generator to prevent hunting action.

8. In a motor control circuit, a motor having an armature winding and a field winding producing a constant field flux, a source of constant frequency current, a source of alternating current having a frequency varying according to the motor speed, a three-element phase-detector tube having potentials impressed on the grid and plate by said sources, the armature winding of said motor being connected to the output circuit of said detector tube to be operated according to the phase relation between the potentials impressed on the plate and the grid of the tube, and means comprising a condenser connected across the variable source of alternating current for preventing hunting action.

9. In a motor control circuit, a relatively low speed motor having an armature winding and a substantially constant field excitation, a source of standard frequency alternating current, a source of alternating current having a frequency varying according to the motor speed, two three-element phase-detector tubes connected in push-pull relation, said standard frequency source impressing potential on the grids of said tubes and said second source of current impressing potential on the plates of said tubes, and means for amplifying the output from said phase-detector tubes and for supplying the amplified current to the motor armature to effect operation of said motor synchronously with the frequency of said standard frequency source.

10. In a motor control circuit, a relatively low speed motor having an armature winding and a field winding, a source of standard frequency alternating current, an alternating current generator having a frequency varying according to the motor speed, two three-element phase-detector tubes connected in push-pull relation, said standard frequency source impressing potential on the grids of said tubes and said generator impressing potential on the plates of said tubes, means for amplifying the output from said phase-detector tubes and for supplying the amplified current to the motor armature to effect operation of said motor synchronously with the frequency of said standard frequency source, and means for tuning the circuit of said generator to prevent hunting action.

11. In a motor control circuit, a relatively low speed motor having an armature winding and a field winding, a source of standard frequency alternating current, a variable source comprising an alternating current generator having a frequency varying according to the motor speed, a phase-detector tube supplied with grid and plate potentials by said sources, an amplifier tube and means comprising resistance and inductance for coupling the output circuit of said detector tube to the input circuit of said amplifier tube and for increasing the control applied to the amplifier tube during transients to prevent hunting action, the output circuit of said amplifier tube being connected to the motor armature for supplying said armature with current according to the phase relation between the currents from said sources to operate the motor synchronously with the standard frequency source.

12. In a motor control circuit, a relatively low speed motor having an armature winding and means to produce a substantially saturated field, a source of constant frequency current for controlling said motor, a source of alternating current having a frequency varying according to the motor speed, a phase-detector tube supplied with grid and plate potentials by said sources, an amplifier having input and output circuits, and means comprising resistance and inductance for coupling the output circuit of said detector tube to the input circuit of said amplifier and for increasing the control applied to the amplifier during transients to prevent hunting action, the output circuit of said amplifier being connected to the motor armature for supplying said armature with current according to the phase relation between the currents from said sources to operate the motor synchronously with the standard frequency source.

13. In a regulator system, a master speed reference means, a motor having armature and field windings and adapted to be regulated with respect to said reference means, a source for supplying direct current power to the armature winding of said motor comprising a grid controlled space discharge device, a source of alternating current controlled by said motor, and means for governing said device under the joint control of said reference means and said source of alternating current to maintain the motor speed synchronous with said reference means.

14. In a control circuit, a motor having an armature winding and a field winding, speed reference means for said motor, control means for governing said motor to maintain the speed thereof synchronous with said speed reference means, said control means comprising a source of alternating current controlled by said motor and means for supplying the armature winding of said motor with current varied under the joint control of said reference means and said source of alternating current, and means operating on said control means to prevent hunting action.

15. In a regulator system, a master speed reference means, a motor having armature and field windings and adapted to be regulated with respect to said reference means, a source for supplying direct current power to the armature winding of said motor comprising a grid controlled space discharge device, a source of alternating current controlled by said motor, control means for governing said device under the joint control of said reference means and said source of alternating current to maintain the motor speed synchronous with said reference means, and means operating on said control means to prevent hunting action.

EDMUND R. MORTON.